(12) United States Patent
Soma et al.

(10) Patent No.: US 11,799,871 B2
(45) Date of Patent: Oct. 24, 2023

(54) MANAGING SECURITY OF NETWORK COMMUNICATIONS IN AN INFORMATION HANDLING SYSTEM

(71) Applicant: Dell Products L.P., Round Rock, TX (US)

(72) Inventors: Dileep Kumar Soma, Austin, TX (US); Harpreet Narula, Austin, TX (US); Brian E. Manser, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 17/077,513

(22) Filed: Oct. 22, 2020

(65) Prior Publication Data

US 2022/0131869 A1  Apr. 28, 2022

(51) Int. Cl.
*H04L 29/00* (2006.01)
*H04L 9/40* (2022.01)

(52) U.S. Cl.
CPC .......... *H04L 63/105* (2013.01); *H04L 63/164* (2013.01); *H04L 63/20* (2013.01)

(58) Field of Classification Search
CPC ...... H04L 63/105; H04L 63/164; H04L 63/20
See application file for complete search history.

(56) References Cited

U.S. PATENT DOCUMENTS

2002/0162024 A1* 10/2002 Cunchon .............. H04L 63/104
726/12
2013/0246627 A1* 9/2013 Taylor .................. H04L 63/104
709/227
2014/0094159 A1* 4/2014 Raleigh ................. H04W 24/02
455/418

OTHER PUBLICATIONS

Fairhurst, G. "Update to IANA Registration Procedures for Pool 3 Values in the Differentiated Services Field Codepoints (DSCP) Registry", Internet Engineering Task Force (IETF), University of Aberdeen, Aug. 2018.
Nichols et al., "Definition of the Differentiated Services Field (DS Field) in the IPv4 and IPv6 Headers", Network Working Group, Dec. 1998, The Internet Society.

\* cited by examiner

*Primary Examiner* — Jeffrey C Pwu
*Assistant Examiner* — Helai Salehi
(74) *Attorney, Agent, or Firm* — Norton Rose Fulbright US LLP

(57) ABSTRACT

A security level of data generated by an application may be communicated from the application layer to the network layer and that security level used to determine of several available network connects for transmitting the data. A method of communicating may include associating the plurality of network connections with security levels to form associations, the associations indicating security levels of data that may be transmitted over each of the plurality of network connections; receiving, at the network layer, data for transmission; determining, at the network layer, a security level for the data; determining, at the network layer, at least one network connection of a plurality of network connections to transmit the data based, at least in part, on the security level; and transmitting the data packet over the at least one network connection.

13 Claims, 6 Drawing Sheets

| APPLICATION PRIORITY LEVEL | SECURITY LEVEL | INDICATOR CODE (FIRST 3 BITS) | INDICATOR CODE (LAST 3 BITS) |
|---|---|---|---|
| 1 | X | 000 | ASSIGNED BASED ON SECURITY LEVEL |
| 2 | X | 110 | |
| 3 | X | 011 | |
| 4 | X | 101 | |
| X | 1,2 | ASSIGNED BASED ON APP LOCATION PRIORITY LEVEL | 111 |
| X | 3,4 | | 110 |
| X | 5 | | 101 |

| APPLICATION PRIORITY LEVEL | SECURITY LEVEL | INDICATOR CODE (FIRST 3 BITS) | INDICATOR CODE (LAST 3 BITS) |
|---|---|---|---|
| 1 | X | 000 | ASSIGNED BASED ON SECURITY LEVEL |
| 2 | X | 110 | |
| 3 | X | 011 | |
| 4 | X | 101 | |
| X | 1,2 | ASSIGNED BASED ON APP LOCATION PRIORITY LEVEL | 111 |
| X | 3,4 | | 110 |
| X | 5 | | 101 |

FIG. 5

MANAGING SECURITY OF NETWORK COMMUNICATIONS IN AN INFORMATION HANDLING SYSTEM

FIELD OF THE DISCLOSURE

The instant disclosure relates to information handling systems. More specifically, portions of this disclosure relate to network traffic management in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include multiple network adaptors for communicating on different communications networks. Conventionally, each data packet generated on the information handling system is assigned to one of the available communications networks based on characteristics of the network, such as bandwidth, latency, and reliability. However, this may result in some data packets containing secure data being transported over insecure networks making the secure data vulnerable to viewing by unauthorized users.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

A security level of data generated by applications may be signaled as an indicator associated with the data, from the application layer executing in a user mode to a network layer executing in a kernel mode, and that indicator used in determining a communications link for transmitting the packets. A kernel mode driver for with access to various network adapters of an information handling system may receive the data and the indicator comprising the security level and determine one of several available network connections for transmitting the data based on the security level. This can improve the security of the data by preventing the possibility of an unauthorized user obtaining the packet, and the data contained therein. This process of maintaining the security level of the data improves the functioning of the information handling system by preventing security breaches and maintaining the security of the information handling system. One manner for avoiding security measures on an information handling system is to transport the data to another device with lower security restrictions. The data transmission techniques described in embodiments of this disclosure reduce the likelihood that a third party can improperly obtain copies of high security data on the information handling system.

Although some examples are presented in this disclosure involving the IP protocol, the encoding of security level information may be incorporated into other packet structures and other communication techniques by inserting new fields or re-using existing fields of other communications systems. For example, the techniques may be applied to different data structures than packets, such as frames. Embodiments of the disclosure may be used in information handling systems such as personal computers (PCs), cellular phones, tablets, routers, switches, firewalls, and other devices with network adaptors.

"User mode" as used in embodiments of this disclosure refers to applications executing in a private virtual address space supported by the operating system, in which one application executing in a user mode cannot normally access memory from other user mode software. Software described in embodiments herein as executing in the "user mode" should include software executing solely in user mode and software executing in part in user mode and in part in kernel mode.

"Kernel mode" as used in embodiments of this disclosure refers to applications other than "user mode" applications, such as application that have access to a single virtual address space with other kernel mode software. This means that a kernel-mode driver is not isolated from other drivers and the operating system itself. Software described in embodiments herein as executing in the "kernel mode" should include software executing solely in kernel mode and software executing in part in kernel mode and in part in user mode.

"Application layer" as used in embodiments of this disclosure refers to the "application layer" or layer 7 of the open systems interconnection (OSI) model, and includes functional and procedural aspects of an information handling system for interacting with a user through applications, such as applications executing in a user mode of an operating system. Within an information handling system, the "application layer" functional and procedural aspects may be handled by software code executed at the user mode, software code executing at the kernel mode, software code executing at the hardware level, firmware embedded in hardware components, and/or a combination thereof. "Lower" levels than the application layer refer to layers 1, 2, 3, 4, 5, and 6.

"Network layer" as used in embodiments of this disclosure refers to the "network layer" or layer 3 of the open systems interconnection (OSI) model, and includes functional and procedural aspects of an information handling system for transferring variable length data sequences from one system to another connected system. Within an information handling system, the "network layer" functional and procedural aspects may be handled by software code executed at the user mode, software code executing at the kernel mode, software code executing at the hardware level, firmware embedded in hardware components, and/or a combination thereof. "Higher" levels than the network layer refer to layers 4, 5, 6, and 7, whereas "lower" levels than the network layer refer to layers 1 and 2.

Conventionally, communication occurs from one layer of the OSI model to a neighboring layer of the OSI model, without allowing communications between separated layers of the OSI model, such as from layer 7 (the application layer) to layer 3 (the network layer). Embodiments of this disclosure provide for an operating system filtering platform that provides hooks into each layer of the OSI model through an application programming interface. Thus, information may be communicated between non-neighboring layers of the OSI model to indicate a security level of the data being communications, such as by communicating an indicator of a security level from the application layer to the network layer.

According to one embodiment, a method may include receiving, at the device at the network layer, data for transmission; determining, by the device at the network layer, a security level for the data; determining, by the device at the network layer, at least one network connection of a plurality of network connections to transmit the data based, at least in part, on the security level; and/or transmitting, by the device, the data packet over the at least one network connection. The determination of the packet security level for the data may be based on receiving an indication of the security level from an application layer. In some embodiments, the indication may include the actual security level, and in other embodiments the indication may include an indicator that is translated to a security level, such as through a look-up table. The indication may be received through an application interface for passing information from a software module executing in a user mode to a software module executing in a kernel mode. Additional criteria may be used to determine the network connection for transmitting the data, such as an application priority level associated with the data. The application priority level may be likewise indicated in information passed from the application executing in the user mode to the network layer executing in the kernel mode.

The network connection determination may be made by, for example, determining a secure network connection from the plurality of network connections for transmission of the data in a first condition when the security level corresponds to secure data, determining any of the plurality of network connections for transmission of the data in a second condition when the packet security level corresponds to insecure data and the application priority level corresponds to high-priority data, and determining an insecure network connection from the plurality of network connections for transmission of the data in a third condition when the data packet does not correspond to the first condition and does not correspond to the second condition.

The method may be embedded in a computer-readable medium as computer program code comprising instructions that cause a processor to perform the steps of the method. In some embodiments, the processor may be part of an information handling system including a first network adaptor configured to transmit data over a first network connection of a plurality of network connections; a second network adaptor configured to transmit data over a second network connection of a plurality of network connections; a memory; and a processor coupled to the first network adaptor, the second network adaptor, and the memory.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 5 is a table illustrating a mapping of indicator codes to application priority and security levels according to some embodiments of the disclosure.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
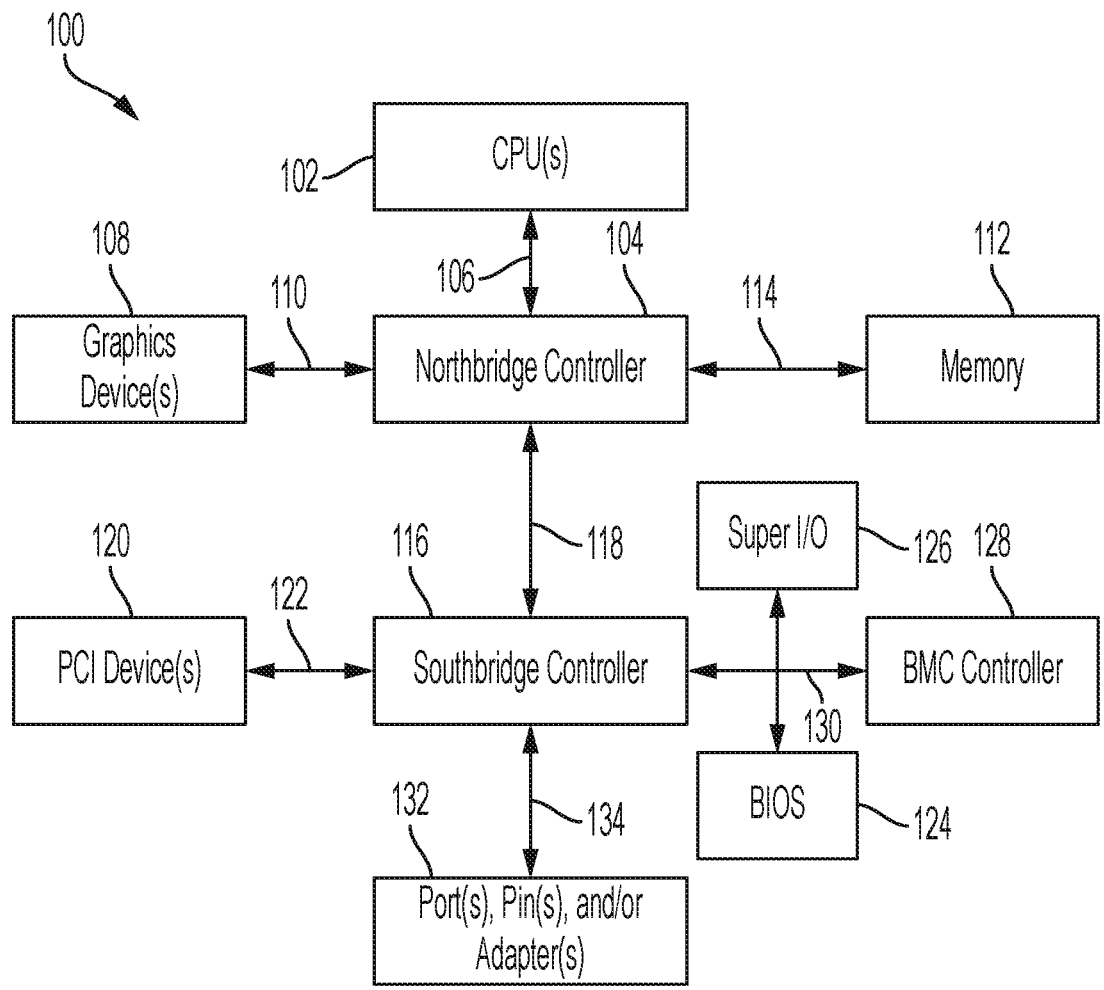
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, first network adaptor, second network adaptor, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

BIOS 124 may include non-volatile memory having program instructions stored thereon. The instructions stored on the BIOS may be usable CPU(s) 102 to initialize and test other hardware components and/or to load an Operating System (OS) onto IHS 100, for example during a pre-boot stage. For example, BIOS may also refer to a set of instructions, stored on BIOS 124, that are executed by CPU(s) 102. As such, BIOS 124 may include a firmware interface that allows CPU(s) 102 to load and execute certain firmware, as described in more detail below. In some cases, such firmware may include program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS' firmware interface to initialize and test components of IHS 100.

In some embodiments, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116. Super I/O Controller 126 combines interfaces for a variety of lower bandwidth or low data rate devices. Those devices may include, for example, floppy disks, parallel ports, keyboard and mouse, temperature sensor and fan speed monitoring, etc.

In some embodiments, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
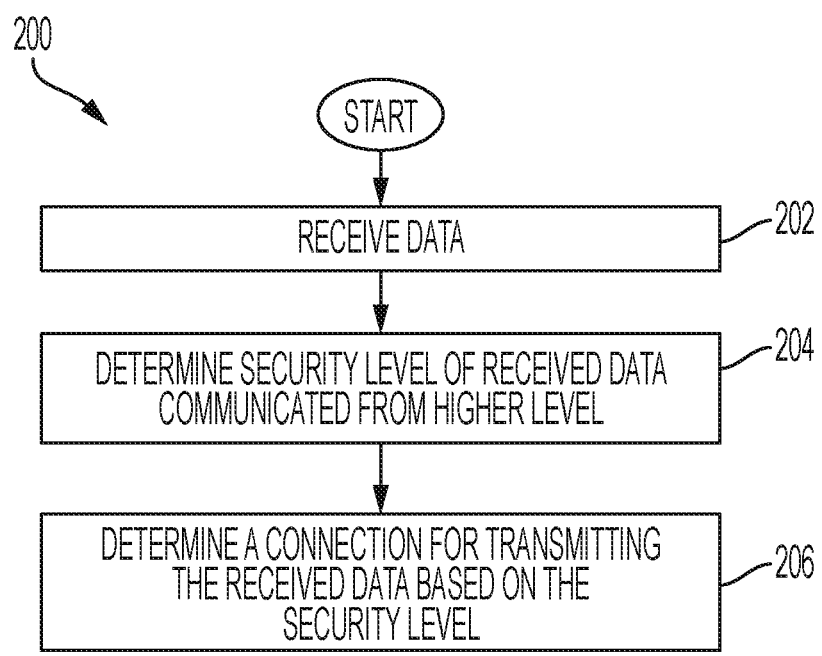
FIG. 2 is a flow chart illustrating a method of determining a network connection based on a security level of data for transmission according to some embodiments of the disclosure.

FIG. 2 is a flow chart illustrating a method of determining a network connection based on a security level of data for transmission according to some embodiments of the disclosure. The method 200 may be performed within software modules operating in the kernel mode and at the network layer. The network layer receives data for transmission from an application executing in an application layer through an operating system. A method 200 may begin at block 202 with receiving data for transmissions, which may be formatted in, for example, a packet according to a communication protocol. At block 204, the security level of the data is determined. For example, the security level may be determined, for example, from an indicator passed through signaling from software modules executing in the user mode to software modules executing in the kernel mode. In some embodiments, the indicator is passed through an application programming interface provided by a dynamic link library (DLL). The security level may be one of a predefined set of security levels. An example predefined set of security levels in order of decreasing security levels includes highly restricted, restricted, internal use, customer communication, and external public. Then, at block 206, a network connection is determined from a set of available network connections for transmitting the packet received at block 202. The determination at block 206 is based, at least in part, on the security level associated with the data. For example, when the security level is above a threshold level, such as internal use or above, transmission of the packet may be restricted to a certain subset of available network connections.

Figure 3:
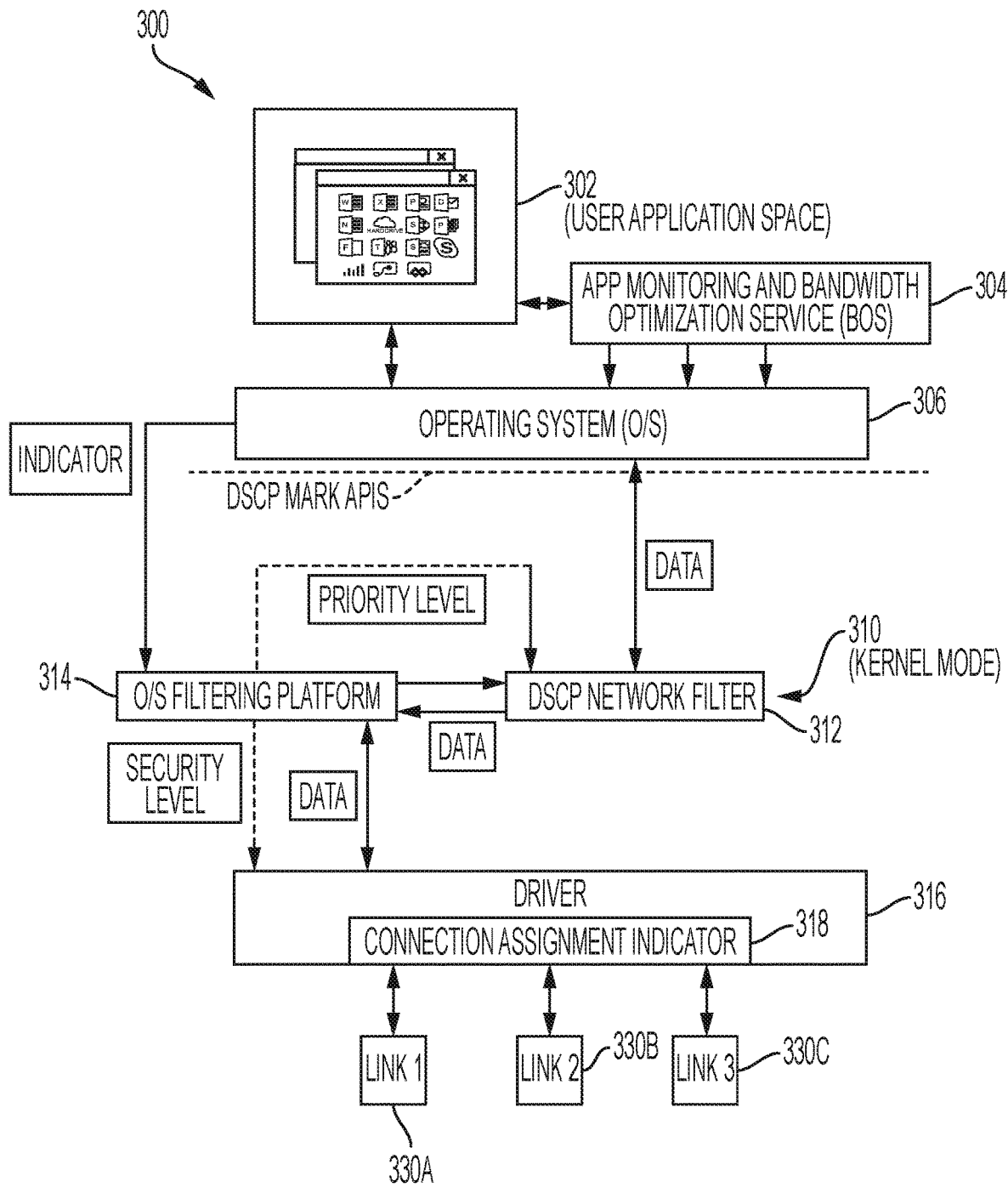
FIG. 3 is a block diagram illustrating application and network layers in an information handling system according to some embodiments of the disclosure.

Embodiments of the description, such as the method 200 of FIG. 2, may be implemented in components of an information handling system. One example implementation in an information handling system is shown in FIG. 3. FIG. 3 is a block diagram illustrating software modules at the application and network layers in an information handling system according to some embodiments of the disclosure. A system 300 may include applications executing in a user application space 302. The user application space 302 is executed in a user mode by an operating system (O/S) 306, and the user application space 302 may be executing at the application layer or other layers above the network layer. An application monitoring and bandwidth optimization service (BOS) 304 may monitor applications in the user application space 302 and provide information to the operating system 306 for managing the execution of the applications. The BOS 304 may determine security levels for applications in the user application space and/or the data those applications generate for transmission over a network connection. The BOS 304 provides information to the operating system 306, which then uses the security level determination to appropriately form network data transmissions requests to be handled by the driver 316, which may be operating at the network layer. The driver 316 may be a software module, such as a NDIS miniport bridge, that manages the physical hardware for a network interface card (NIC), such as the sending and receiving of data through the NIC. The driver 316 may also interface with higher-level drivers, such as a filtering platform 314, which may operate at the network layer, the application layer, and/or other layers.

For example, the BOS 304 may identify an intranet application executing in the user application space 302 and provide information to the operating system 306 that data transmitted by the intranet application should be treated as restricted. The operating system 306 may generate data packets with data from the intranet application and pass the data packets to the DSCP network filter 312, which may be operating at the network layer, and signal an indicator with the corresponding security level for the data to the filtering platform 314. That indicated security level may be used by driver 316 to determine a network communication link from the available network communications links 330A-C to transmit the data packet. For example, the indicator may have a plurality of bits in which a first portion of those bits indicate the priority level. The filtering platform 314 may separate those bits from the indicator and provide the security level to the driver 316.

A kernel mode 310 of the operating system 306 provides core services, such as network communications, to the applications in user application space 302. Network-related services executed in kernel mode 310 may include the operating system filtering platform 314 and the DSCP network filter 312, each of which may assist in communicating information from an application through a network adaptor controlled by driver 316. The filtering platform 314 may be a software module that provides access to a set of hooks into the network stack and a filtering engine that coordinates network stack interactions. Applications in the application space 302 operate at the application layer, but may pass information to lower layers, such as the network layer, through hooks provided by the filtering platform 314. For example, a dynamic link library (DLL) may provide application interfaces for passing information from the application space 302 executing at the application layer in a user mode to kernel mode 310 modules, including the filtering platform 314, which has hooks in the network stack to forward the information to the network layer or other layers. One software module at the network layer is the DSCP network filter 312, which also operates in kernel mode 310. Another software module at the network layer is the driver 316, which also operates in kernel mode 310.

In some embodiments, the indicator to the filtering platform 314 may also provide an application priority level associated with data for transmission. The filtering platform 314 may pass information, such as an application priority level, to the DSCP network filter 312 and information, such as a security level, to the miniport bridge 316 for handling data from applications. For example, a first set of bits of the indicator may be separated by the filtering platform 314 and provided to the driver 316 as a security level and a second set of bits of the indicator may be separated by the filtering platform 314 and provided to the DSCP network filter 312 as an application priority level.

A driver executing in the kernel mode 310, such as the driver 316, may manage the transmission of data over physical interfaces, such as an a first wireless network connection (e.g., a 5 GHz Wi-Fi connection) 330A, a second wireless network connection (e.g., a 2.4 GHz Wi-Fi connection) 330B, and a wired network connection (e.g., a Ethernet connection) 330C. Although three available network connections 330A-C are shown, additional or fewer network connection may be available in the system 300. In different embodiments, different network connections may be available, such as one or more 3G cellular connections, 4G cellular connections, 5G cellular connections, and 5G mmWave cellular connections. The designation of a security level for each of the network connections 330A-C may be based on the type of network (e.g., cellular, Wi-Fi, LAN, WAN), the connected network (e.g., the SSID of a Wi-Fi AP or the CellID of a cellular base station) and/or an endpoint of the network. For example, 3G/4G/5G cellular networks may be designated as low security connections, some Wi-Fi networks may be designed as low security connections based on AP name, and some Wi-Fi networks may be designated as high security connections based on AP name.

The driver 316 may include a connection assignment indicator (CAI) module 318. In one embodiment, the CAI 318 may implement the method 200 of FIG. 2 for determining one of the available connections 330A-C for transmitting data. For example, the CAI 318 may receive data for transmission on a network connection and determine a security level of the data. The CAI 318 may then determine at least one network connection from the available network connections 330A-C to transmit the data packet. The determination of a communication link may be based on information signaled to the CAI 318 from higher levels. For example, the filtering platform 314 may receive an indicator of a security level for the data from higher levels, such as the operating system 306. A DLL interface may allow the operating system 306 and/or applications in the application space 302 to communicate the indicator to the kernel mode filtering platform 314. Although the CAI 318 is described in some embodiments as part of driver 316, the CAI 318 may be included in other software executing on an information handling system to process network data for transmission and manages data over multiple network communication links.

In some embodiments, the CAI 318 may have a predefined mapping of the available security levels as corresponding to "secure" (e.g., high security) or "insecure" (e.g., low security) transmissions, such as by applying a threshold level to the available security levels. "Predefined" may refer to a mapping that exists prior to the CAI 318 receiving the data for transmission, or a mapping that is preconfigured by the operating systems 306, or a mapping that is set before the operating system 306 initializes the driver 316. The mappings may be downloaded through an update service that collects information, such as by crowd-sourcing data, regarding the security level of various network connections. Each of the network connections 330A-C may be designated as a "secure" or "insecure" network connection, and the secure network connections used to transmit the secure transmissions (e.g., with security levels above the threshold) and the insecure network connections used to transmit the insecure transmissions (e.g., with security levels below the threshold). When multiple available network connections match a security level of the data, additional criteria may be used to select one or more of the available network connections matching the security level, such as bandwidth, cost, latency, priority, and/or distance. In some embodiments, the data may be transmitted out through all network connections matching the security level of the data. In some embodiments, the CAI 318 may implement a computer learning algorithm that is trained with example data and/or corresponding security levels, and the trained computer learning algorithm is used to determine one or more of the available network connections for transmitting the data based on the indicated security level.

In some embodiments, the CAI 318 may have a predefined whitelist or blacklist that maps each of the predefined security levels to the available network connections 330A-C. For example, the network connection 330A may have a whitelist permitting internal use, customer communication, and external public communications (e.g., security levels 3-5), the network connection 330B may have a whitelist permitting restricted, internal use, customer communication, and external public communications (e.g., security levels 2-5), and the network connection 330C may have a whitelist permitting all levels of communications (e.g., security levels 1-5). Additionally or alternatively, blacklists may be defined for each of the network connections. For example, the network connection 330A may have a blacklist denying highly restricted and restricted security level data transmissions, the network connection 330B may have a blacklist denying highly restricted data transmissions, and the network connection3 330C may have a null or empty blacklist indicating no data transmissions are prohibited.

Figure 4:
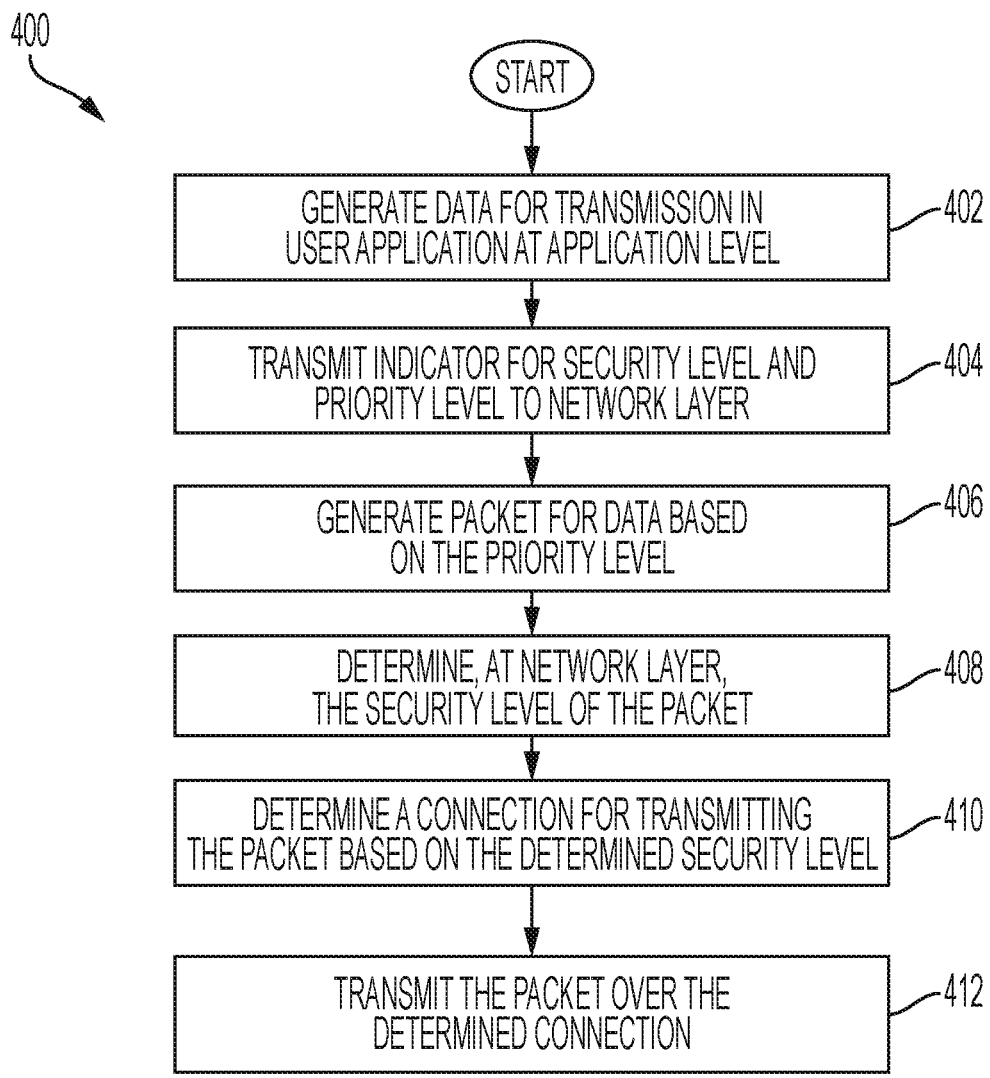
FIG. 4 is a flow chart illustrating a method for determining network connection for data transmission based on a security level according to some embodiments of the disclosure.

One method for communicating data over a link based on security level is described with reference to FIG. 4. FIG. 4 is a flow chart illustrating a method for determining network connection for data transmission based on a security level according to some embodiments of the disclosure. A method 400 begins at block 402 with generating data for transmission in a user application at an application level of an information handling system. Referring to the system 300 of FIG. 3, an application executing in the application space 302 may generate data and provide the data to the operating system 306 for transmission over a network. At block 404, an indicator is transmitted from the operating system 306 to a filtering platform 314 executing in the kernel mode 310 through an interface provided by a DLL. The indicator may indicate a security level and/or priority level that may be determined, for example, by an application monitoring service 304 of FIG. 3. The monitoring service 304 may, for example, have a look-up table of security levels and priority levels corresponding to applications executing in the application space 302, and the look-up values may be communicated to the kernel mode 310.

The data is received at block 406 at the network level, such as at the DSCP network filter 312. A packet for the data, such as an Internet Protocol (IP) packet, is generated for the data, and the DSCP code of the packet may be set based on the priority level determined from the indicator received from the application layer. The security level of the data is determined at block 408 by receiving an indicator at the filtering platform 314 from the application layer. At block 410, a network connection is determined based on the determined security level of block 408. At block 414, the data is transmitted over the network connection determined at block 410, such as in an Internet Protocol (IP) packet. The IP packet may have a DSCP code corresponding to the application priority level.

An example mapping of bits for the indicator transmitted from the application layer to the network layer is shown in FIG. 5. FIG. 5 is a table 500 illustrating a mapping of indicator codes for an example 6-bit indicator to application priority and security levels according to some embodiments of the disclosure. Each of the columns 502 and 504 list in rows 510, 512, 514, 516, 518, 520, and 522 possible application priority and security levels, such as 1-4 for application priority and 1-5 for security. Each of the columns 506 and 508 list a first portion and a second portion of indicator codes corresponding to each of the combination of application priority and security levels listed in rows 510, 512, 514, 516, 518, 520, and 522. In each of the example assignments in rows 510, 512, 514, 516, 518, 520, and 522, the first three bits of the indicator code are determined by the application priority shown in column 502 and the last three bits of the indicator code are determined by the security. Although a 6-bit indicator is illustrated in the example of FIG. 5, other lengths may be used for the indicator, such as to provide more discrete levels of security and/or priority.

Figure 6:
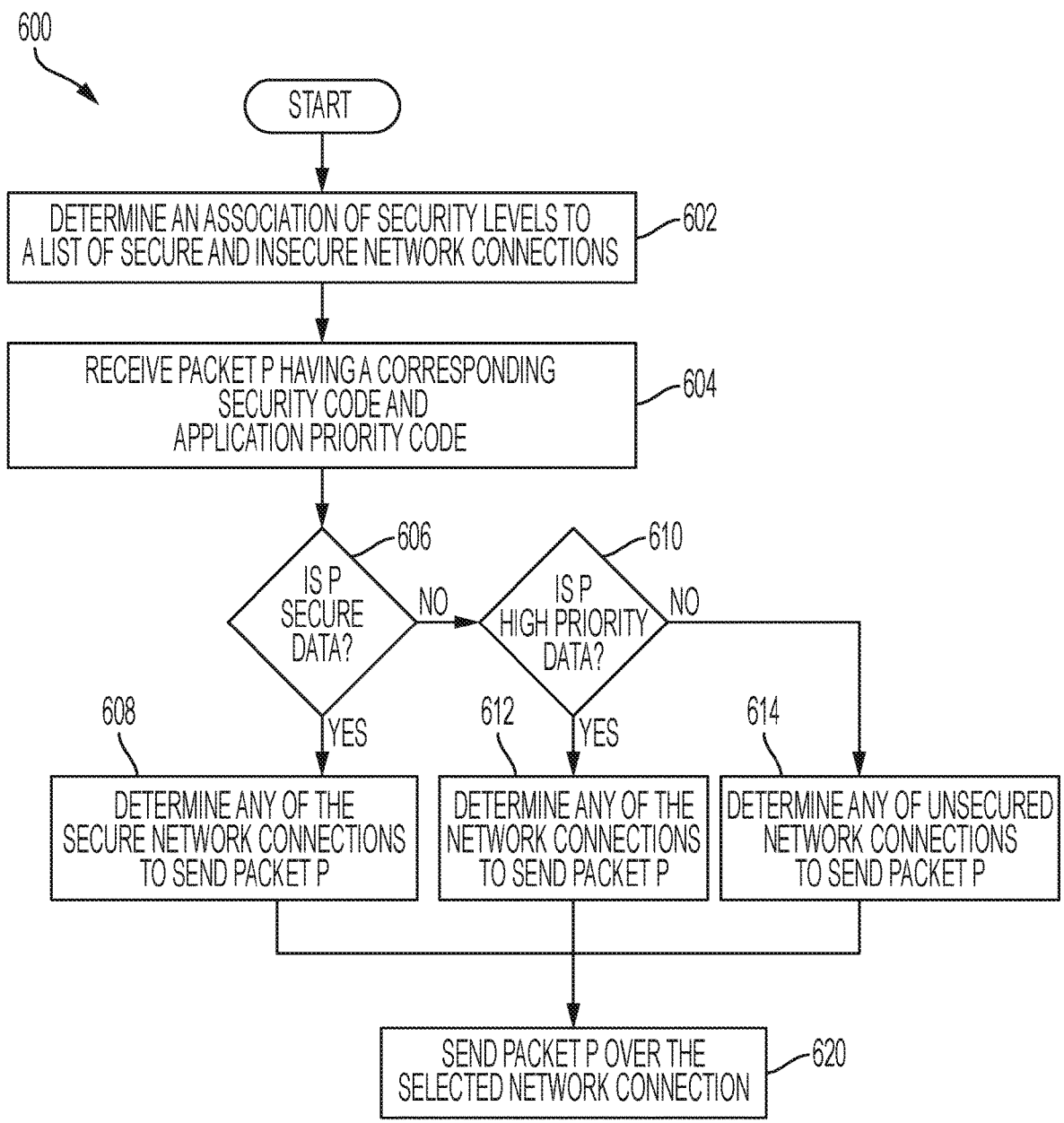
FIG. 6 is a flow chart illustrating a method of determining a network connection based on application priority and security level according to some embodiments of the disclosure.

An example method for determining a network connection based on application priority and security levels is described with reference to FIG. 6. FIG. 6 is a flow chart illustrating a method of determining a network connection based on application priority and security level according to some embodiments of the disclosure. A method 600 begins at block 602 with the determining an association of security levels to a list of secured and insecure network connections. The determined associations may be stored in a configuration file and retrieved each time the CAI is initialized. At block 604, a packet is received that has corresponding security and application priority levels. At block 606, the CAI determines from the encoding of packet P whether the contents are secure data or not, such as by thresholding the security level corresponding to the packet P. If the data is secure, then the method 600 continues to block 608 to determine any one of the available network connections associated as a secure connection in the associations of block 602 to transmit the data. When multiple secure network connections are available, the packet may be transmitted on a random one of the connections, on one of the connections in a round robin manner, or one of the connections corresponding to other criteria. If the data is not determined to be secure at block 606, the method 606 continues to block 610.

At block 610, the CAI determines if the data is high priority, such as by thresholding the application priority level. If the data is high priority, then the method 600 continues to block 612 to determine any of the available network connections for transmitting the packet P. When the packet P has no security requirement and is high priority, any available network connection should be used to transmit packet P because of the high priority. One or more of the available network connections may be determined in a random or round-robin manner, or by applying other criteria. In some embodiments, the packet P may be transmitted through all available network connections because of the high priority of the packet P. If the packet P is not high priority, then the method 600 continues to block 614 to determine any of the unsecured network connections to transmit packet P. One or more of the available unsecured network connections may be determined in a random or round-robin manner, or by applying other criteria. The network connections for transmitting packet P when not secure and not high priority may be restricted to the unsecured network connections to maintain availability of the secure network connections for secure packets and/or high priority packets P. After determining a network connection at one of blocks 608, 612, or 614, the method 600 continues to block 620 to transmit the packet P over the determined network connection.

In one example application of the method 600, there may be five network connections labeled A, B, C, D, and E. The associations of block 602 may identify connections A and B as secure, and connections C, D, and E as insecure. A data packet P1 may be received at block 604 with a corresponding security level of 1 and an application priority level of 2. Applying the method 600 in this example would result in the CAI proceeding through block 606 to block 608 to blacklist network connections C, D, and E for packet P1. Block 608 may result in the determination of connection A and packet P1 is transmitted over connection A at block 620.

The schematic flow chart diagrams of FIG. 2, FIG. 4, and FIG. 6 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by an information handling system may be performed by computer processing unit (CPU) or other processing logic or circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
receiving, at a device at a network layer, data for transmission;
receiving, at the device at the network layer from an application layer, an indication associated with the data;
determining, by the device at the network layer, a security level for the data based, at least in part, on the indication according to a mapping of indicators to security levels;
determining, by the device at the network layer, at least one network connection of a plurality of network connections to transmit the data in at least one data packet based, at least in part, on the security level and an association of the at least one network connection with the security level, the at least one network connection determined further based on an application priority level associated with the data; and transmitting, by the device, the at least one data packet over the at least one network connection.

2. The method of claim 1, wherein receiving the indication comprises receiving information through an application interface for passing information from a software module executing in a user mode to a software module executing in a kernel mode.

3. The method of claim 1, wherein determining the at least one network connection comprises:

determining a secure network connection from the plurality of network connections for transmission of the data in a first condition when the security level corresponds to secure data;

determining any of the plurality of network connections for transmission of the data in a second condition when the security level corresponds to insecure data and the application priority level corresponds to high-priority data; and determining an insecure network connection from the plurality of network connections for transmission of the data in a third condition when the data packet does not correspond to the first condition and does not correspond to the second condition.

4. The method of claim 1, further comprising associating the plurality of network connections with security levels to form associations, the associations indicating security levels of data that may be transmitted over each of the plurality of network connections.

5. An apparatus, comprising:

a memory; and a processor coupled to the memory and configured to perform steps comprising:

receiving, at a network layer, data for transmission;

receiving, at the network layer from an application layer, an indication associated with the data;

determining, at the network layer, a security level for the data based, at least in part, the indication according to a mapping of indicators to security levels;

determining, at the network layer, at least one network connection of a plurality of network connections to transmit the data in at least one data packet based, at least in part, on the security level and an association of the at least one network connection with the security level, the at least one network connection determined further based on an application priority level associated with the data; and transmitting the at least one data packet over the at least one network connection.

6. The apparatus of claim 5, wherein receiving the indication comprises receiving information through an application interface for passing information from a software module executing in a user mode to a software module executing in a kernel mode.

7. The apparatus of claim 5, wherein determining the application priority level comprises receiving an indication of the application priority level from the application layer.

8. The apparatus of claim 5, wherein determining the at least one network connection comprises:

determining a secure network connection from the plurality of network connections for transmission of the data in a first condition when the security level corresponds to secure data;

determining any of the plurality of network connections for transmission of the data in a second condition when the security level corresponds to insecure data and the application priority level corresponds to high-priority data; and determining an insecure network connection from the plurality of network connections for transmission of the data in a third condition when the data packet does not correspond to the first condition and does not correspond to the second condition.

9. The apparatus of claim 5, wherein the processor is further configured to associate the plurality of network connections with security levels to form associations, the associations indicating security levels of data that may be transmitted over each of the plurality of network connections.

10. An information handling system, comprising:

a first network adaptor configured to transmit data over a first network connection of a plurality of network connections;

a second network adaptor configured to transmit data over a second network connection of the plurality of network connections;

a memory; and a processor coupled to the first network adaptor, to the second network adaptor, and to the memory, wherein the processor is configured to perform steps comprising:

associating the plurality of network connections with security levels to form associations, the associations indicating security levels of data that may be transmitted over each of the plurality of network connections, including a first security level for the first network adaptor and a second security level for the second network adaptor;

receiving, at a network layer, data for transmission;

determining, at the network layer, a security level for the data, wherein determining the security level for the data comprises receiving an indication of the security level from an application layer;

determining, at the network layer, at least one network connection of the plurality of network connections to transmit the data in at least one data packet based, at least in part, on the security level and an association of the at least one network connection with the security level, the at least one network connection determined further based, at least in part, on an application priority level associated with the data; and transmitting the at least one data packet over the at least one network connection.

11. The information handling system of claim 10, wherein receiving the indication comprises receiving information through an application interface for passing information from a software module executing in a user mode on the processor to a software module executing in a kernel mode on the processor.

12. The information handling system of claim 10, wherein determining the at least one network connection comprises:

determining a secure network connection from the plurality of network connections for transmission of the data in a first condition when the security level corresponds to secure data;

determining any of the plurality of network connections for transmission of the data in a second condition when the security level corresponds to insecure data and the application priority level corresponds to high-priority data; and determining an insecure network connection from the plurality of network connections for transmission of the data in a third condition when the data packet does not correspond to the first condition and does not correspond to the second condition.

13. The information handling system of claim 10, wherein the processor is configured to execute a driver operating at the network layer for accessing the first network adaptor and the second network adaptor, and wherein the processor is configured to execute a filtering platform, wherein the filtering platform provides an application interface to the network layer for receiving the indication of the security level from the application layer.

\* \* \* \* \*